Figures 1, 2:
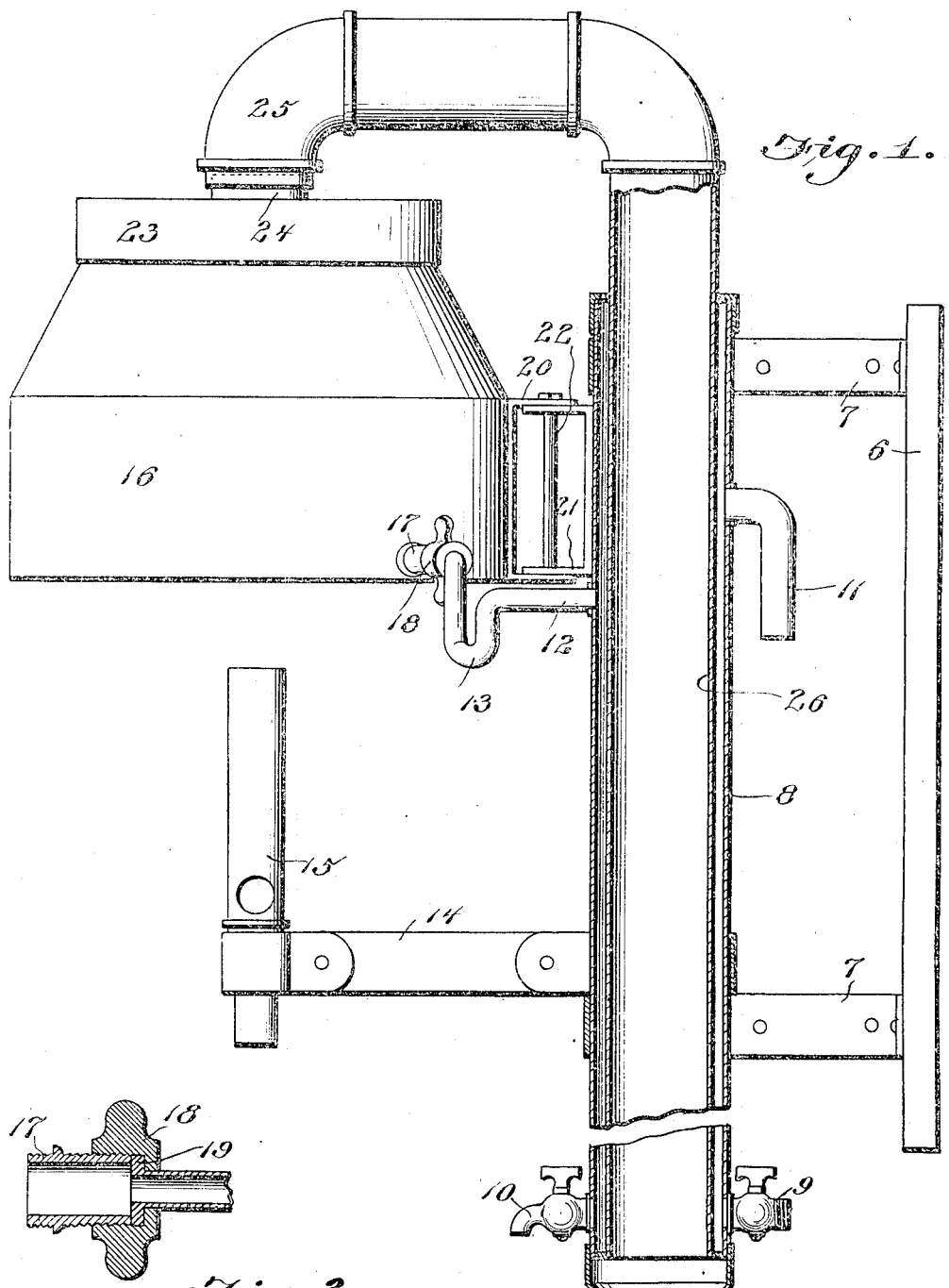

No. 818,831. PATENTED APR. 24, 1906.
L. KLEITZ.
DISTILLING APPARATUS.
APPLICATION FILED OCT. 23, 1905.

Witnesses
M. A. Schmidt
Geo. E. Tew

Inventor
Lambert Kleitz
by Milo B. Stevens & Co
Attorneys

UNITED STATES PATENT OFFICE.

LAMBERT KLEITZ, OF CHICAGO, ILLINOIS, ASSIGNOR TO EDWARD C. WAGNER, OF LA FAYETTE, INDIANA.

DISTILLING APPARATUS.

No. 818,831. Specification of Letters Patent. Patented April 24, 1906.

Application filed October 23, 1905. Serial No. 283,966.

*To all whom it may concern:*

Be it known that I, LAMBERT KLEITZ, a citizen of the United States, residing at Chicago, in the county of Cook and State of Illinois, have invented new and useful Improvements in Distilling Apparatus, of which the following is a specification.

This invention is an improvement in apparatus for distilling water, and has for its object to provide means whereby the parts of the still can be readily taken apart.

Sediment collects in the boiling-chamber of water-stills and has to be, or should be, frequently cleaned out. At the same time the parts must be practically steam-tight and water-tight while in use. By means of my invention the vessel in which the water is boiled can be readily detached from its supply-pipe and supports and removed for the purpose of being cleaned.

In the accompanying drawings, Figure 1 is a view of the apparatus, partly in section. Fig. 2 is an enlarged detail in section, showing the coupling between the inlet-pipe and the boiling-chamber, Referring specifically to the drawings, 6 indicates a supporting board or wall to which are secured brackets 7, which support the outer casing 8 of the condenser. An inlet for cold water to this casing is indicated at 9 and a petcock to drain at 10, also an overflow at 11, and a supply-pipe to the boiler at 12, having a trap 13. Also connected to this casing is a bracket 14, which supports the burner-pipe 15.

The boiling vessel 16 has a nipple 17, which is connected to the pipe 12 by means of a hand coupling ring or nut 18, which is flanged over the end of the pipe 12, as indicated at 19, and has threads which screw on the threaded nipple 17 so as to make a water-tight joint; but, nevertheless, one which can be readily disengaged by unscrewing the coupling. The boiling vessel is supported by means of brackets 20, which fit and rest upon brackets 21, supported on the condenser-casing 8, and the respective brackets are held together by a pin 22, which fits through holes in said brackets. The boiling vessel has a cover 23, which has a nipple 24 having a slip-joint with a pipe 25, which leads out and thence down to the condensing-tube 26 within the casing 8. At the bottom of the tube is the outlet 27 for the distilled water.

In the general operation of the apparatus the steam generated in the vessel 16 passes over into the condensing-tube where it is condensed by the cold water surrounding the same, and water is supplied to the boiling vessel through the pipe 12 and maintained at constant level by the overflow 11.

When it is desired to disconnect the boiling vessel for the purpose of cleaning the same, the coupling 18 is unscrewed and the pin 22 removed, the water having first been drained off from the cock 10. The vessel can then be turned slightly to disengage the brackets 20 and 21, and then lowered to disconnect the joint at 24, after which the cover 23 can be taken off and any sediment or dirt within the vessel removed. As will be seen, no soldered joints need to be broken, and the boiling vessel can be very readily removed and replaced.

What I claim as new, and desire to secure by Letters Patent, is—

1. In a distilling apparatus, a boiler connected by a slip-joint with a pipe leading to a condenser-tube, and a condenser-casing surrounding said tube and having a separable bracket-support for the boiler, and a supply-pipe leading from the casing to the boiler and having a coupling which may be opened to disconnect the boiler.

2. In a distilling apparatus, in combination, a boiler, a removable cover thereon having a separable joint with a pipe leading to a condenser-tube, a condenser-casing around said tube, a separable bracket between the casing and boiler, to support the latter, and a pipe connecting the condenser-casing and the boiler and having a coupling which may be opened to disconnect the boiler.

In testimony whereof I have signed my name to this specification in the presence of two subscribing witnesses.

LAMBERT KLEITZ.

Witnesses:
EDWARD C. WAGNER,
H. G. BATCHELOR.